United States Patent
Yin et al.

(10) Patent No.: US 11,774,238 B2
(45) Date of Patent: Oct. 3, 2023

(54) LIGHT PROJECTION METHOD AND LIGHT PROJECTION DEVICE

(71) Applicant: Hangzhou UPhoton Optoelectronics Technology Co., Ltd., Zhejiang Province (CN)

(72) Inventors: Xiaodong Yin, Zhejiang Province (CN); Kehan Tian, Zhejiang Province (CN); Lixin Wei, Zhejiang Province (CN)

(73) Assignee: Hangzhou UPhoton Optoelectronics Technology Co., Ltd., Zhejiang Province (CN)

( * ) Notice: Subject to any disclaimer, the term of this patent is extended or adjusted under 35 U.S.C. 154(b) by 65 days.

(21) Appl. No.: 17/426,540

(22) PCT Filed: Jan. 10, 2020

(86) PCT No.: PCT/CN2020/071356
§ 371 (c)(1),
(2) Date: Jul. 28, 2021

(87) PCT Pub. No.: WO2020/156096
PCT Pub. Date: Aug. 6, 2020

(65) Prior Publication Data
US 2022/0090914 A1  Mar. 24, 2022

(30) Foreign Application Priority Data

Feb. 1, 2019  (CN) .......................... 201910105589.4
Feb. 1, 2019  (CN) .......................... 201920186585.9
(Continued)

(51) Int. Cl.
*G01B 11/25* (2006.01)
*G01B 11/02* (2006.01)
*G02B 27/42* (2006.01)

(52) U.S. Cl.
CPC ........ *G01B 11/2513* (2013.01); *G01B 11/026* (2013.01); *G02B 27/4205* (2013.01)

(58) Field of Classification Search
CPC .............. G01B 11/2513; G01B 11/026; G02B 27/4205; G02B 27/425; G06V 10/141; G06V 40/16
See application file for complete search history.

(56) References Cited

U.S. PATENT DOCUMENTS 9,528,906 B1  12/2016  Yasovsky et al.
2011/0001957 A1*  1/2011  Braune ................... G01S 17/04
356/4.01
(Continued)

FOREIGN PATENT DOCUMENTS

CN  107182218 A  9/2017
CN  108303835 A  7/2018
(Continued)

OTHER PUBLICATIONS

PCT/CN2020/071356, International Search Report dated Apr. 10, 2020, 5 pages.
(Continued)

*Primary Examiner* — Jonathan M Hansen
(74) *Attorney, Agent, or Firm* — Meunier Carlin & Curfman LLC

(57) ABSTRACT

A light projection method with safety protection and a light projection device with safety projection. The light projection method (200) comprises: turning on a light source at a safe power level (S201); using a diffractive optical element to modulate light emitted from the light source so as to project a pattern onto a target surface (S202); acquiring the pattern (S203); determining whether the pattern is normal (S204); and if so, turning on the light source at a rated power level, wherein the rated power level is higher than the safe power level (S205). The invention enables an optical system to
(Continued)

have a smaller size while ensuring safety of a user, simplifies a structure, reduces costs, and facilitates efficient utilization of optical energy.

19 Claims, 6 Drawing Sheets

(30) Foreign Application Priority Data

Feb. 13, 2019 (CN) .......................... 201910113196.8
Feb. 13, 2019 (CN) .......................... 201920194700.7

(56) References Cited

U.S. PATENT DOCUMENTS

| | | | |
|---|---|---|---|
| 2012/0074296 A1* | 3/2012 | Hammes | G06V 10/141 250/205 |
| 2016/0371845 A1 | 12/2016 | Yasovsky et al. | |
| 2019/0295279 A1* | 9/2019 | Wang | H04N 5/2352 |

FOREIGN PATENT DOCUMENTS

| | | |
|---|---|---|
| CN | 108376251 A | 8/2018 |
| CN | 108445643 A | 8/2018 |
| CN | 108490629 A | 9/2018 |
| CN | 108508620 A | 9/2018 |
| CN | 108508624 A | 9/2018 |
| CN | 108700917 A | 10/2018 |
| CN | 109932828 A | 6/2019 |

OTHER PUBLICATIONS

Extended European Search Report issued in EP20749027.7, dated Sep. 29, 2022.

* cited by examiner

LIGHT PROJECTION METHOD AND LIGHT PROJECTION DEVICE

TECHNICAL FIELD

The present invention relates to the technical field of optics, especially to the technical field of analysis of projected patterns to guarantee safety.

BACKGROUND

Most of the existing facial recognition technologies are based on two-dimensional images, in which there are problems like cumbersome steps for detecting living bodies and a low level of safety. With the launch of iPhone X, 3D facial recognition technology was brought into the market of consumer electronics, and solved the problem about complex and unsafe steps for detecting living bodies. According to the 3D facial recognition technology of iPhone X, facial recognition is done following the steps of using infrared laser as a light source, modulating the same into a random dot matrix by a diffractive optical element (DOE), projecting onto a human face the dot matrix that forms each face's unique features on the human face, and then extracting the human face features in combination with a two-dimensional facial image. The laser modulated by a DOE has the scattered power distribution and low power per unit area, falling under the safe and acceptable threshold for human eyes. However, if the DOE is abnormal (e.g., breaks or falls off), the unmodulated laser will have a concentrated power distribution, which may cause injuries to human eyes if irradiating the human eyes. Therefore, a set of measures is needed to ensure the safety of human eyes. The DOE of iPhone X has an ITO (Indium Tin Oxide Semiconductor). By monitoring the capacitance of the ITO, it can be determined whether the DOE is abnormal, and then the laser will be turned off to protect the human eyes from direct laser irradiation if an anomaly occurs.

The working process of the facial recognition of iPhone X is shown in FIG. 1, and the details will be described below:
1. Detecting a distance between a human face and a facial recognition module when the proximity sensor works, activating a flood illuminator when the distance is within a certain range (such as 200 mm-700 mm), emitting uniform infrared light to illuminate the human face, and using an infrared camera to take a facial image;
2. Turning off the flood illuminator, activating a dot projector, projecting the infrared dot matrix onto the human face, and using the infrared camera to take a facial dot matrix image; and
3. Sending the facial image and the facial dot matrix image to an application processing unit, thereby completing the facial recognition.

In this structure, an ITO detection module is needed, which makes the facial recognition module more complex in structure, larger in size, and increased in cost while the utilization of light energy decreases.

In the structure of the dot projector of iPhone X, a collimating lens is arranged downstream of the optical path of the laser light source to collimate the laser. A diffractive optical element and an ITO are arranged downstream of the optical path of the collimating lens. By monitoring the capacitance of the ITO, it can be determined whether the diffractive optical element is abnormal, and if so, the laser will be turned off to protect the human eyes from the harm caused by direct laser irradiation.

The contents in the Background are merely the technologies known by the inventors, and does not necessarily represent the prior art in the field.

SUMMARY OF THE INVENTION

With regard to one or more of the defects existing in the prior art, the present invention provides a light projection method and device with safety protection. According to the embodiments of the present invention, the DOE designed for a divergent light source can be applied to facial recognition, thereby proposing a novel method for safety protection for human eyes, such that an ITO can be removed so as to simplify the structure, decrease the size and reduce costs, and also facilitate efficient utilization of optical energy.

For this purpose, the present invention provides a light projection method with safety protection, comprising: turning on a light source at a safe power level; using a diffractive optical element to modulate light emitted from the light source so as to project a pattern onto a target surface; acquiring the pattern; and determining whether the pattern is normal and if the pattern is normal, turning on the light source at a rated power level.

In accordance with one aspect of the present invention, the light projection method further comprises: turning off the light source if the pattern is abnormal, wherein the light source is preferably a laser light source, and the rated power level is preferably higher than the safe power level.

In accordance with one aspect of the present invention, the light projection method further comprises: calculating the safe power level based on a distance between the light source or the diffractive optical element and the target surface.

In accordance with one aspect of the present invention, the light projection method further comprises: determining that a fault lies in the light source and/or the diffractive optical element if the pattern is abnormal.

In accordance with one aspect of the present invention, the light source is configured to emit divergent light of nonplanar waves, and the diffractive optical element is preferably a diffractive optical element that performs optical modulation for the wavefront phase distribution of the incident light field.

In accordance with one aspect of the present invention, no collimating lens is used to perform collimation processing between the light source and the diffractive optical element, and/or no ITO is used to filter the light modulated by the diffractive optical element.

The present invention further provides a light projection device, comprising: a light source; a diffractive optical element configured to modulate light emitted from a light source so as to project a pattern onto a target surface; an image acquisition unit configured to acquire the pattern; a processing unit coupled to the image acquisition unit and determining whether the pattern is normal, and if the pattern is normal, turning on the light source at a rated power level.

In accordance with one aspect of the present invention, the processing unit is configured to turn off the light source if the pattern is determined to be abnormal, wherein the light source is preferably a laser light source. The light projection device may further comprise a proximity sensor and/or a distance sensor to measure a distance between the light source or the diffractive optical element and the target surface. The processing unit is also configured to calculate the safe power level based on the distance between the light source or the diffractive optical element and the target surface, wherein the rated power level is preferably higher than the safe power level.

In accordance with one aspect of the present invention, the light projection device further comprises: the processing unit further configured to determine that a fault lies in the light source and/or the diffractive optical element if the pattern is determined to be abnormal.

In accordance with one aspect of the present invention, the light source is configured to emit divergent light of nonplanar waves, and the diffractive optical element is a diffractive optical element that performs optical modulation for the wavefront phase distribution of the incident light field, wherein preferably no collimating lens is provided between the light source and the diffractive optical element, and/or no ITO is provided on the surface of the diffractive optical element or downstream of the optical path of the diffractive optical element.

The present invention provides an electronic device, comprising: a body; and a light projection device as described above.

In accordance with one aspect of the present invention, the electronic device further comprises a proximity sensor and/or a distance sensor capable of detecting a distance from the light projection device, and a processing unit of the light projection device is configured to perform the following operations when the distance is detected to be within a predetermined range: turning on the light source at a safe power level; using a diffractive optical element to modulate light emitted from a light source so as to project a pattern onto a target surface; acquiring the pattern; and determining whether the pattern is normal, and if the pattern is normal, turning on the light source at a rated power level, wherein the rated power level is preferably higher than the safe power level.

The light projection method and the light projection device according to the embodiments of the present invention can make the optical system smaller in size, simple in structure, and reduced in cost and also improve the utilization of optical energy while ensuring the safety of a user.

BRIEF DESCRIPTION OF THE DRAWINGS

The drawings are provided for the purpose of further understanding of the present invention, and constitute part of the present invention, which should serve to illustrate the present invention together with the embodiments, but make no limitation of the present invention. In the drawings.

DETAILED DESCRIPTION OF THE EMBODIMENTS OF THE INVENTION

Figure 1:
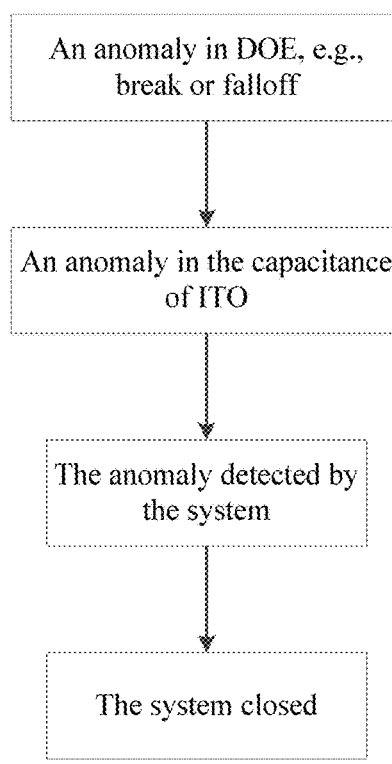
FIG. 1 illustrates the method for protecting the safety of human eyes in iPhone X.

Certain exemplary examples will be described below only in a brief manner. Just as those skilled in the art will appreciate, changes in various ways to the examples described herein can be carried out without departing from the spirit or scope of the present invention. Therefore, the drawings and the following description are deemed essentially exemplary, instead of limitative.

In the description of the present invention, it needs to be understood that the orientation or position relations denoted by such terms as "central" "longitudinal" "latitudinal" "length" "width" "thickness" "above" "below" "front" "rear" "left" "right" "vertical" "horizontal" "top" "bottom" "inside" "outside" "clockwise" "counterclockwise" and the like are based on the orientation or position as shown in the accompanying drawings, and are used only for the purpose of facilitating description of the present invention and simplification of the description, instead of indicating or suggesting that the denoted devices or elements must be specifically oriented, or configured or operated in some specific orientation. Thus, such terms should not be construed to limit the present invention. In addition, such terms as "first" and "second" are only used for the purpose of description, rather than indicating or suggesting relative importance or implicitly indicating the number of the designated technical features. Accordingly, features defined with "first" or "second" may, expressly or implicitly, include one or more of such features. In the description of the present invention, "more" means two or above, unless otherwise defined explicitly and specifically.

In the description of the present invention, it needs to be noted that, unless otherwise specified and defined explicitly, such terms as "mount" "link" and "connect" should be understood as generic terms. For example, connection may refer to fixed connection, dismountable connection, or integrated connection; also to mechanical connection, electric connection or intercommunication; further to direct connection, or connection by an intermediary medium; or even to internal communication between two elements or interaction between two elements. For those skilled in the art, they can construe the specific meaning of such terms herein in light of specific circumstances.

Herein, unless otherwise specified and defined explicitly, if a first feature is "above" or "below" a second one, this may cover the direct contact between the first and second features, also cover the contact via another feature there between, instead of the direct contact. Furthermore, if a first feature "above", "over" or "on the top of" a second one, this may cover that the first feature is right above or on the inclined top of the second feature, or just indicate that the first feature has a horizontal height higher than that of the second feature. If a first feature is "below", "under" or "on the bottom of" a second feature, this may cover that the first feature is right below and on the inclined bottom of the second feature, or just indicates that the first feature has a horizontal height lower than that of the second feature.

The disclosure below provides many different embodiments and examples so as to achieve different structures described herein. In order to simplify the disclosure herein, the following will give the description of the parts and arrangements embodied in specific examples. Surely, they are just for the exemplary purpose, not intended to limit the present invention. Besides, the present invention may repeat a reference number and/or reference letter in different examples, and such repeat is for the purpose of simplification and clarity, which does not represent any relation among various embodiments and/or arrangements as discussed. In addition, the present invention provides examples for a variety of specific techniques and materials, but those skilled in the art can be aware of the application of other techniques and/or use of other materials.

The preferred examples of the present invention will be introduced below, along with the drawings. It should be understood that the preferred examples described herein are only for the purpose of illustrating and explaining, instead of restricting, the present invention.

Figure 2:
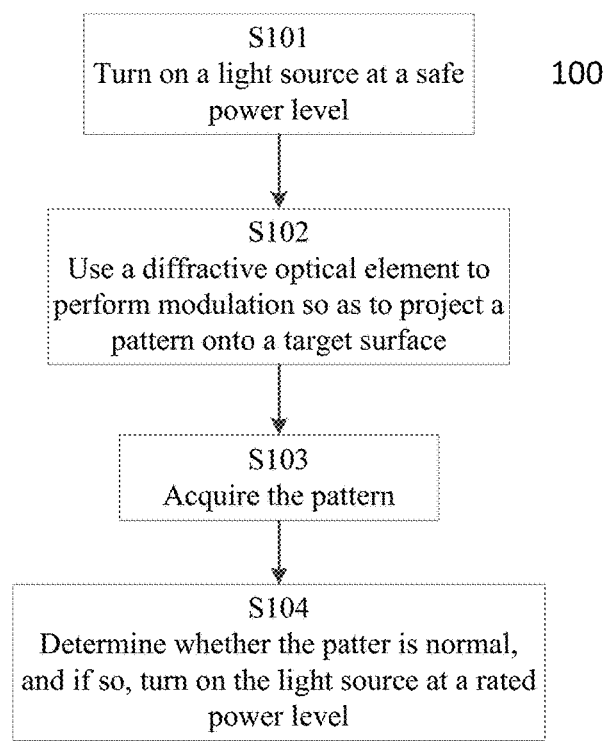
FIG. 2 illustrates a light projection method according to one embodiment of the present invention.

FIG. 2 illustrates a light projection method 100 according to one embodiment of the present invention, for example, for protecting the eyes of a user from being exposed to strong light so as to prevent damage to the eyes. In addition to its purpose of protecting the safety of human eyes, the light projection method 100 of the present invention may also be used for protecting the safety of other objects or surfaces to be illuminated, and this does not impose a limitation on the protection scope of the present invention.

As shown in FIG. 2, a light source is turned on at a safe power level in step S101.

According to one preferred embodiment, the light source may be a laser light source. As those skilled in the art can understand, the protection scope of the present invention is not limited to this, and other types of light sources, for example a LED light source, can also be used. The light source, for example, is configured to emit divergent light of nonplanar waves, for example spherical waves.

In the present invention, the safety power level refers to a light source power that is safe for a user or the eyes of the user. The safety power level can be determined according to the parameters like light source type and illumination distance. Taking a laser light source as an example, the wavelength of the laser light source can be obtained according to the parameters of the laser light source. Then, according to the National Standards of the People's Republic of China—Safety of Laser Products, Part 14, the threshold R of laser radiation power allowed for an irradiated object, for example human eyes, is calculated for a certain period of time, and the safe power level P of the laser light source is calculated assumed that the diffractive optical element falls off, namely under the condition that the laser light source directly irradiates the object (for example the human eyes), and the safe power level P is used as the standard for ensuring the safety of human eyes. According to one preferred embodiment, the illumination distance is taken for reference at the time of calculating the safe power level. Power is related to distance, for example, the working distance from a human face to an optical module can be detected by a proximity sensor and/or distance sensor. Taking a working distance of 200 mm as an example, the luminous wavelength valued as $\lambda=940$ nm, and the illumination time set into t=50 ms, then MPE=4.42 mw can be obtained by calculation; and when a distance from the laser light source to the human eyes is 200 mm, the power of the laser light source is 372 mw by calculation, namely when the luminous power of the laser light source is 372 mw, the distance between the human eyes and the laser light source is longer than 200 mm, such that the human eyes are still safe even if the diffractive optical element DOE falls off, which means that power level equal to or lower than this one is a safe power level.

In step S102, light emitted from the light source is modulated by a diffractive optical element so as to project a pattern onto a target surface.

Currently, those common diffractive optical elements DOE are designed with regard to collimated light (for example, a collimating lens is included in the optical module of iPhone). According to one preferred embodiment of the present invention, a diffractive optical element of the present invention can modulate divergent light having nonplanar waves, and is designed with regard to the parameters of a laser irradiating light source to perform optical modulation for the wavefront phase distribution of the incident light field (for example, by means of the iterative analysis of Fourier optical transmission). The wavefront of the incident light field may be either planar waves or nonplanar waves (e.g., spherical waves). The diffractive optical element is a diffractive optical element optically designed with regard to the parameters such as the wavefront of the laser light source, being used to provide the distribution of the light field as required by the optical system. The light field of the laser light source, after being optically modulated by the diffractive optical element, transmits regionally at a particular angle.

In step S103, the pattern is acquired.

For example, the pattern projected onto the target surface, for example a human face, can be collected by a camera or webcam.

In step S104, it is determined whether the pattern is normal, and if so, the light source is turned on at a rated power level.

Figure 5:
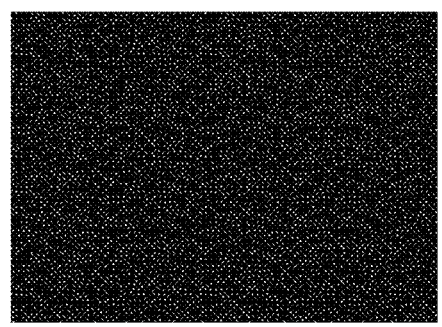
FIG. 5 illustrates a light spot pattern in a normal working state.
Figure 6A:
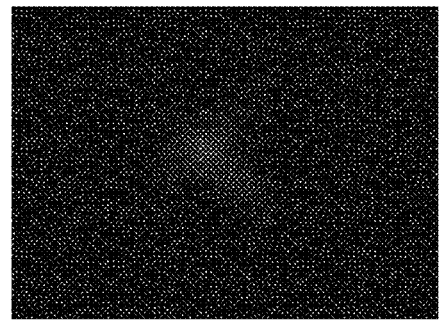
FIGS. 6A and 6B illustrate a light spot pattern when the diffractive optical element fails.
Figure 6B:
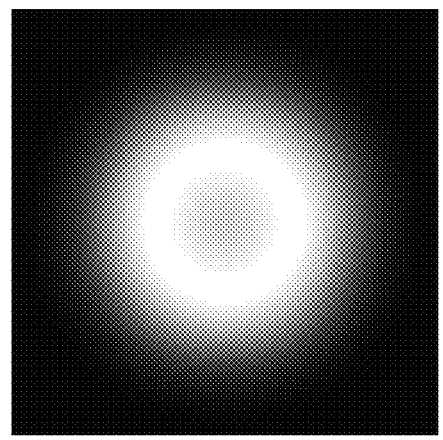
Figure 7A:
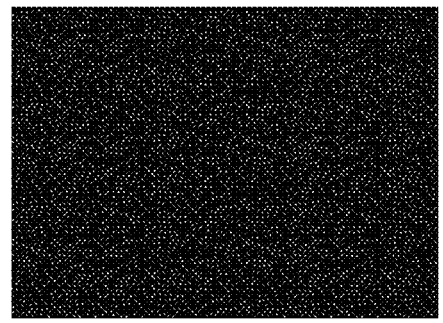
FIGS. 7A, 7B and 7C illustrate a light spot pattern when the light source fails.
Figure 7B:
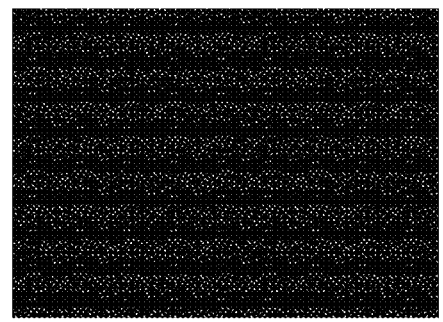
Figure 7C:
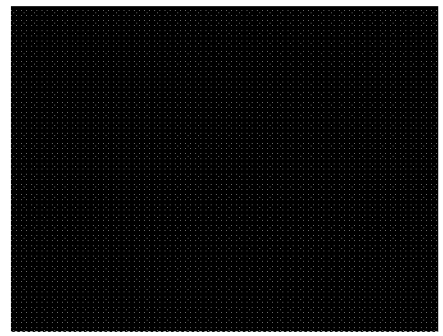

When the diffractive optical element works normally, the pattern projected onto the target surface should be distributed as random dots, and as shown in FIG. 5, distributed rather uniformly and densely. Furthermore, when the diffractive optical element fails or falls off, the pattern projected may be a large area of fuzzy light spots. FIG. 6A shows a pattern of light spots when an anomaly, for example a break, occurs in the diffractive optical element, from which it can be seen that there will be noise in the local area after the diffractive optical element breaks. FIG. 6B shows a pattern of light spots when an anomaly, for example a falloff, occurs in the diffractive optical element, in which an abnormally large light spot appears because modulation is not performed by the diffractive optical element. FIG. 7A shows a pattern when VCSEL has a bad pixel, in which it can be found that a large gap exists in the dot array. FIG. 7B shows a pattern when VCSEL has more bad pixels. And FIG. 7C shows a pattern when VCSEL is completely off, and the image is all black. After the pattern is acquired, it can be determined whether the projected pattern is normal by means of image processing and analysis.

Those skilled in the art can understand that the rated power level described herein may be a fixed value, or may be a variable value, for example, a variable value determined by one or more of environment, light intensity, battery, and other factors. As long as the power level enables the light source to work normally, it is then regarded as a rated power level. For example, when the external light is strong, the rated power level of the light source must be high enough so as to ensure that the pattern projected onto the target surface is clearly visible and can be acquired and processed; and when the external light is weak, the rated power level of the light source can be slightly lower, namely enough to ensure that the projected pattern can be clearly visible and meet the requirements for acquisition and processing. These are all within the protection scope of the present invention. Preferably, the rated power level is higher than the safety power level. However, the present invention is not only limited to this.

Figure 3:
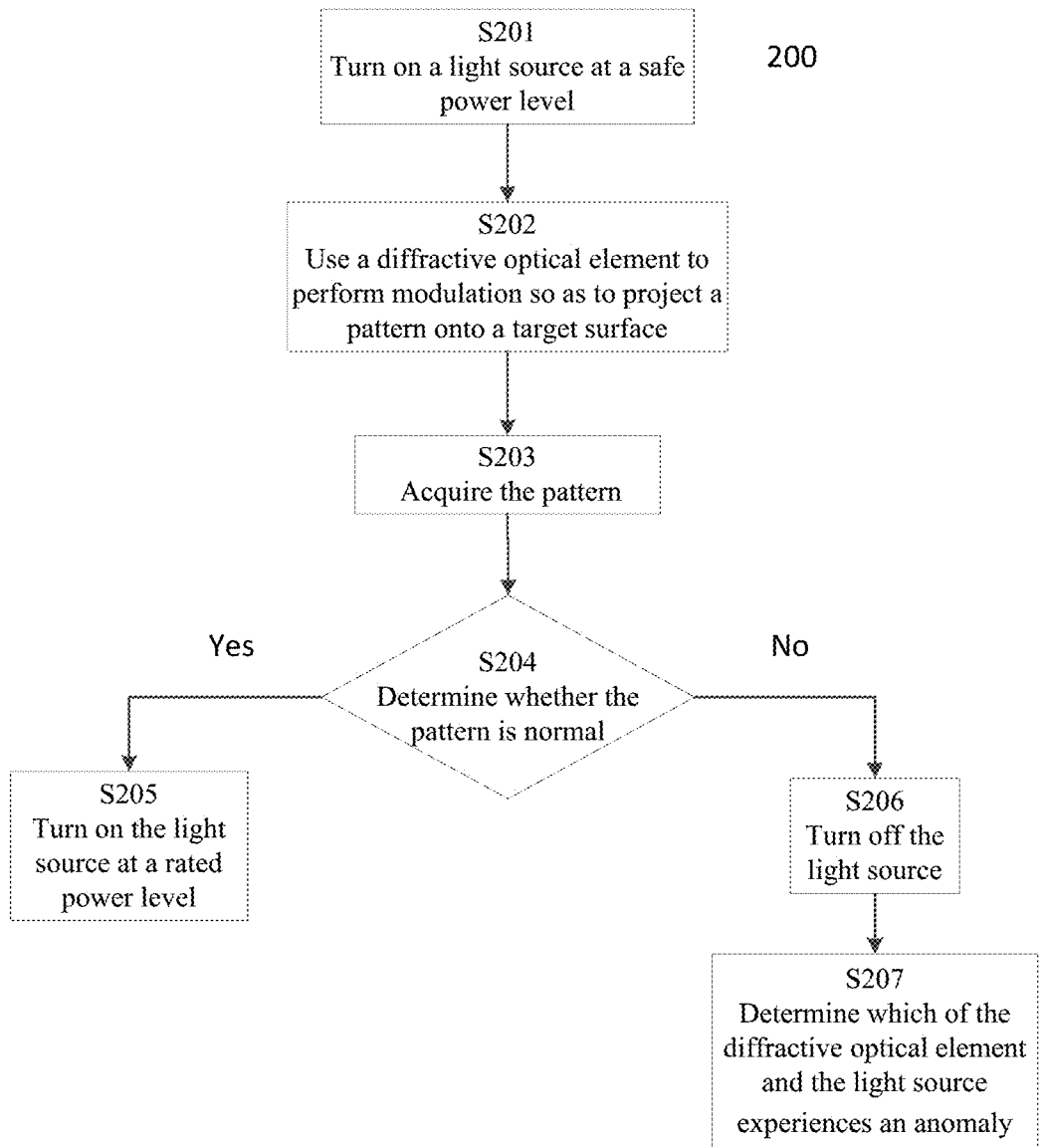
FIG. 3 illustrates a light projection method according to one preferred embodiment of the present invention.

FIG. 3 illustrates a light projection method 200 according to one preferred embodiment of the present invention.

The steps S201, S202, S203, S204 and S205 in the light projection method 200 correspond to the steps S101, S102, S103 and S104 in the light projection method of the previous embodiment. These steps will not be repeated below.

In the light projection method 200, if it is determined that the image is abnormal in step S204, the light source is turned off (step S206). When the image is determined to be abnormal, which indicates that a fault takes place in the diffractive optical element and/or the light source, the light source is then turned off such that damage to the user can be completely avoided.

According to one preferred embodiment of the present invention, the light projection method 200 further comprises: determining that the fault lies in the light source and/or the diffractive optical element in step S207, if the pattern is abnormal. As shown in FIGS. 7A, 7B and 7C, the pattern when the light source fails and the pattern when the diffractive optical element fails each have their own characteristics. According to the patterns indicating a fault, the fault can be located so as to determine whether it occurs in the light source or the diffractive optical element or both. For example, a database of faults can be established according to the patterns of light spots with various faults, then a light spot pattern, after being acquired, can be compared with patterns of various faults in the database of faults by the mode recognition method so as to recognize the fault mode and determine the fault location.

As those skilled in the art can understand, although step S206 is performed prior to step S207 as shown in FIG. 3, the protection scope of the present invention is not limited to the sequence of step S206 and step S207, and the present invention can be performed in the sequence of steps S206 and S207, or in the sequence of steps S207 and S206, or simultaneously. These are all within the protection scope of the claims of the present invention.

According to one preferred embodiment of the present invention, in the light projection methods 100 and 200, no collimating lens is used to perform collimation processing between the light source and the diffractive optical element. Because the diffractive optical element of the present invention can modulate divergent light, it is then a diffractive optical element designed with regard to the parameters of a laser irradiation light source to perform optical modulation for the wavefront phase distribution of the incident light field, for example, by means of the iterative analysis of Fourier optical transmission. The wavefront of the incident light field may be either planar waves or nonplanar waves (e.g., spherical waves).

According to one preferred embodiment of the present invention, the light modulated by the diffractive optical element is not filtered by an ITO in the light projection methods 100 and 200.

Figure 4:
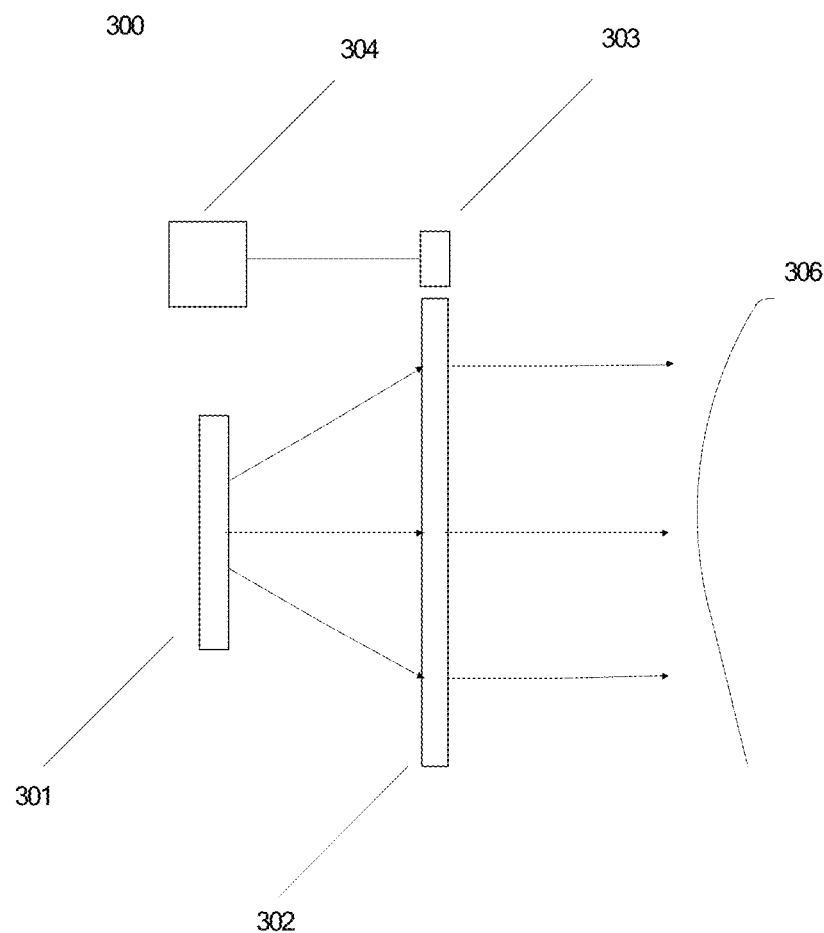
FIG. 4 illustrates a light projection device according to one embodiment of the present invention.

With reference to FIG. 4, a light projection device 300 according to the present invention will be described below. The light projection device 300 may be used to implement the light projection methods 100 and 200 according to the present invention.

As shown in FIG. 4, the light projection device 300 comprises a light source 301, a diffractive optical element 302, an image acquisition unit 303, and a processing unit 304.

Among them, the light source 301 is preferably a laser light source, and surely may also be other types of light sources, for example a LED light source, etc. The light source is preferably configured to emit divergent light of nonplanar waves.

After receiving light emitted from the light source 301, the diffractive optical element 302 can modulate the light emitted from the light source so as to project a pattern onto a target surface 306. The target surface 306 may be a human face or other object surfaces, for example.

The image acquisition unit 303 is, for example, a webcam or camera and can acquire the pattern projected onto the target surface 306.

The processing unit 304 coupled with the image acquisition unit 303 receives and processes the pattern acquired by the image acquisition unit 303, and determines whether the pattern is normal. If the pattern is normal, the light source 301 is turned on at a rated power level. The rated power level is preferably higher than the safe power level. The definitions of the rated power level and the safe power level are recited above and will not be repeated here.

According to one preferred embodiment of the present invention, the processing unit 304 is further configured to turn off the light source if the pattern is determined to be abnormal. When the pattern projected by the diffractive optical element 302 onto the target surface 306 is abnormal, this indicates that the light source or the diffractive optical element has failed. At this time, it is better to turn off the light source in order to avoid damage caused to the user's eyes or other target surfaces. After the fault is recognized and repaired, the system will be restarted.

According to one preferred embodiment of the present invention, the light projection device 300 may further comprise a proximity sensor (not shown) and/or a distance sensor to measure a distance between the light source or the diffractive optical element and the target surface. After the distance is measured between the light source or the diffractive optical element and the target surface, the processing unit can calculate the safe power level based on the distance. The safe power level calculated in this way is more accurate. In addition, the proximity sensor and/or the distance sensor can also help to start the light source 301 in time. For example, when a target surface (e.g., a human face) is sensed to be within a certain distance range, this sensing event can trigger the light source 301 to start at the safe power level. After being modulated by the diffractive optical element, a pattern is projected onto the target surface 306, the pattern then is acquired by the image acquisition unit 303, and processed by the processing unit 304 to determine whether the pattern is abnormal.

According to one preferred embodiment of the present invention, the processing unit 304 is further configured to determine that the fault lies in the light source and/or the diffractive optical element if the pattern is determined to be abnormal.

According to one preferred embodiment of the present invention, the light source 301 is configured to emit divergent light of nonplanar waves, for example spherical waves, and the diffractive optical element 302 is configured to optically modulate the wavefront phase distribution of the incident light field, wherein preferably no collimating lens is provided between the light source and the diffractive optical element, and/or no ITO is provided on the surface of the diffractive optical element or downstream of the optical path of the diffractive optical element.

According to the embodiments of the present invention, since it is not necessary to dispose a collimating lens between the light source and the diffractive optical element, nor is it necessary to provide an ITO on the surface of the diffractive optical element for safety protection, the size of the overall optical system can be made very small. This is a great advantage for increasingly compact electronic devices, especially for mobile phones.

The present invention also relates to an electronic device, comprising: a body and a light projection device as described above. The electronic device may be a mobile phone, PAD, portable computer, face recognition device, monitoring device and other types of electronic devices. The light projection device can be installed on the body or physically separated from the body.

According to one preferred embodiment, the electronic device of the present invention further comprises a proximity sensor and/or a distance sensor that can detect a distance between the light projection device and the surface of the target object, and the processing unit of the light projection device is configured to perform the following operations when the distance is detected to be within a predetermined range: turning on the light source at a safe power level; using the diffractive optical element to modulate light emitted from the light source so as to project a pattern onto the target surface; acquiring the pattern; determining whether the pattern is normal, and if so, turning on the light source at a rated power level. The rated power level is preferably higher than the safe power level.

The predetermined range mentioned above is 200-700 mm, for example.

Various embodiments of the present invention are introduced above mainly by taking human eyes as an example. As those skilled in the art can understand, the application of the present invention is not limited to the above, which can be used in various other occasions, such as skin scanning irradiation, object scanning recognition and other fields that require safety guarantee.

Although various embodiments of the devices and/or processes have been specifically described above using block diagrams, flowcharts and/or examples, such block diagrams, flowcharts and/or examples contain one or more functions and/or operations, and those skilled in the art will understand that a variety of hardware, software, firmware, or almost any combination thereof can be used to individually and/or jointly implement each function and/or operation in such block diagrams, flowcharts, or examples. In one example, several parts of the subject matter described herein may be implemented via an application specific integrated circuit (ASIC), a field programmable gate array (FPGA), a digital signal processor (DSP), or other integrated form. However, those skilled in the art will understand that some aspects of the examples disclosed herein may be equivalently implemented, in whole or in part, in an integrated circuit, or as one or more computer programs operating on one or more computers (e.g., as one or more programs operating on one or more computer systems), as one or more programs operating on one or more processors (e.g., as one or more programs operating on one or more microprocessors), as firmware, or as almost any combination of the above. Besides, designing circuits and/or writing codes for the software and/or firmware fall into the skill range of those skilled in the art in accordance with the present disclosure. For example, if a user determines that speed and accuracy are important, the user may primarily select hardware and/or firmware media; if flexibility is valued, the user may take a software implementation mode as the first choice; or alternatively, the user can select some combination of hardware, software and/or firmware.

Moreover, those skilled in the art will understand that the mechanism of the subject matter described herein can be distributed as various forms of program products, and the illustrative examples of the subject matter described herein are applicable regardless of the specific types of the signal-carrying media actually used to implement the distribution. Examples of the signal-carrying media include but are not limited to the following: recordable media such as floppy disk, hard disk drive, compact disk (CD), digital video disk (DVD), digital tape, computer memory, etc.; and transmission-type media such as digital and/or analog communication media (e.g., optical fiber cable, waveguide, wired communication link, wireless communication link, etc.).

As those skilled in the art will appreciate, it is common in the art to describe devices and/or processes in the manner set forth herein, and thereafter the devices and/or processes described as so will be integrated into a data processing system using engineering practice. Namely, at least part of the devices and/or processes described herein may be integrated into a data processing system through a reasonable number of experiments. It will be understood by those skilled in the art that a typical data processing system generally includes one or more of the following: a system unit housing, a video display device, a memory such as volatile and non-volatile memory, a processor such as a microprocessor and a digital signal processor, a computing entity such as an operating system, a driver, a graphical user interface, and an application program, one or more interactive devices such as a touch pad or touch screen, and/or a control system comprising a feedback loop and a control motor (e.g., feedback for sensing position and/or speed; and a control motor for moving and/or adjusting components and/or quantities). A typical data processing system may be implemented using any suitable commercially available component, such as those common in data computing/communication and/or network computing/communication systems.

The subject matter described herein sometimes indicates different components contained in or connected to other different components. It should be understood that these depicted architectures only serve as an example, and many other architectures that fulfil the same function can be implemented in fact. Conceptually, any arrangement of components that fulfil the same function is effectively "associated" so as to achieve the desired function. Thus, any two components that are combined here to implement a particular function can be considered to be "associated" with each other such that the desired function can be achieved regardless of the architecture or intermediate components. Likewise, any two components associated with each other as so can be further regarded as "operatively connected" or "operatively coupled" with each other to achieve the desired function, and any two components associable with each other as so can be further regarded as "capable of being operatively coupled" with each other to achieve the desired function. Specific examples of operable coupling include, but are not limited to, components that can be physically combined and/or physically interacted, and/or components that can interact wirelessly and/or wirelessly, and/or components that interact logically and/or can interact logically.

Described above are only better embodiments of the present invention, which do not limit the present invention. Any modification, equivalent replacement, improvement, if only falling into the spirit and principles as stated herein, should be included in the protection scope of the present invention.

Last but not least, it should be noted that the contents described above are just preferred examples of the present invention, and are not used to limit the present invention. Although the detailed description of the present invention has been provided with reference to the foregoing examples, those skilled in the art still may make modifications to the technical solutions recorded in various examples described above, or conduct equivalent replacement of some technical features therein. Any modification, equivalent replacement, or improvement, if only falling into the spirit and principles as stated herein, should be included in the protection scope of the present invention.

We claim:

1. A light projection method with safety protection, comprising:
   turning on a light source at a safe power level;
   using a diffractive optical element to modulate light emitted from the light source so as to project a pattern onto a target surface;
   acquiring the pattern; and
   determining whether the pattern is normal to determine anomalies of the light source and/or the diffractive optical element and if the pattern is normal, turning on the light source at a rated power level.

2. The light projection method according to claim 1, further comprising: turning off the light source if the pattern is abnormal, wherein the light source is preferably a laser light source, and the rated power level is preferably higher than the safe power level.

3. The light projection method according to claim 1, further comprising: calculating the safe power level based on a distance between the light source or the diffractive optical element and the target surface.

4. The light projection method according to claim 1, further comprising: determining that a fault lies in the light source and/or the diffractive optical element if the pattern is abnormal.

5. The light projection method according to claim 1, wherein the light source is configured to emit divergent light of nonplanar waves, and the diffractive optical element is preferably a diffractive optical element that performs optical modulation for the wavefront phase distribution of the incident light field.

6. The light projection method according to claim 1, wherein no collimating lens is used to perform collimation processing between the light source and the diffractive optical element, and/or no ITO (Indium Tin Oxide Semiconductor) is used to filter the light modulated by the diffractive optical element.

7. A light projection device, comprising:
   a light source;
   a diffractive optical element configured to modulate light emitted from the light source so as to project a pattern onto a target surface;
   an image acquisition unit configured to acquire the pattern;
   a processing unit coupled to the image acquisition unit and determining whether the pattern is normal to determine anomalies of the light source and/or the diffractive optical element, and if the pattern is normal, turning on the light source at a rated power level.

8. The light projection device according to claim 7, wherein the processing unit configured to turn off the light source if the pattern is determined to be abnormal, wherein the light projection device can further comprise a proximity sensor and/or a distance sensor to measure a distance between the light source or the diffractive optical element and the target surface, and wherein the processing unit is also configured to calculate the safe power level based on the distance between the light source or the diffractive optical element and the target surface.

9. The light projection device according to claim 7, wherein the processing unit further configured to determine that a fault lies in the light source and/or the diffractive optical element if the pattern is determined to be abnormal.

10. The light projection device according to claim 7, wherein the light source is configured to emit divergent light of nonplanar waves, and the diffractive optical element is a diffractive optical element that performs optical modulation for the wavefront phase distribution of the incident light field.

11. The light projection device according to claim 8, wherein the light source is a laser light source, and the rated power level is higher than the safe power level.

12. The light projection device according to claim 10, wherein no collimating lens is provided between the light source and the diffractive optical element, and/or no ITO (Indium Tin Oxide Semiconductor) is provided on the surface of the diffractive optical element or downstream of the optical path of the diffractive optical element.

13. An electronic device, comprising:
    a body; and
    a light projection device;
    wherein the light projection device comprises:
    a light source;
    a diffractive optical element configured to modulate light emitted from the light source so as to project a pattern onto a target surface;
    an image acquisition unit configured to acquire the pattern;
    a processing unit coupled to the image acquisition unit and determining whether the pattern is normal to determine anomalies of the light source and/or the diffractive optical element, and if the pattern is normal, turning on the light source at a rated power level.

14. The electronic device according to claim 13, wherein the processing unit configured to turn off the light source if the pattern is determined to be abnormal, wherein the light projection device can further comprise a proximity sensor and/or a distance sensor to measure a distance between the light source or the diffractive optical element and the target surface; wherein the processing unit is also configured to calculate the safe power level based on the distance between the light source or the diffractive optical element and the target surface.

15. The electronic device according to claim 13, wherein the processing unit further configured to determine that a fault lies in the light source and/or the diffractive optical element if the pattern is determined to be abnormal.

16. The electronic device according to claim 13, wherein the light source is configured to emit divergent light of nonplanar waves, and the diffractive optical element is a diffractive optical element that performs optical modulation for the wavefront phase distribution of the incident light field.

17. The electronic device according to claim 13, further comprising a proximity sensor and/or a distance sensor capable of detecting a distance from the light projection device, and a processing unit of the light projection device configured to perform the following operations when the distance is detected to be within a predetermined range:
   turning on the light source at a safe power level;
   using a diffractive optical element to modulate light emitted from the light source so as to project a pattern onto a target surface;
   acquiring the pattern;
   determining whether the pattern is normal, and if the pattern is normal, turning on the light source at a rated power level, wherein the rated power level is preferably higher than the safe power level.

18. The electronic device according to claim 14, wherein the light source is a laser light source and the rated power level is higher than the safe power level.

19. The electronic device according to claim 16, wherein no collimating lens is provided between the light source and the diffractive optical element, and/or no ITO (Indium Tin Oxide Semiconductor) is provided on the surface of the diffractive optical element or downstream of the optical path of the diffractive optical element.

* * * * *